(12) United States Patent
Butler et al.

(10) Patent No.: US 8,632,032 B2
(45) Date of Patent: Jan. 21, 2014

(54) INVERTED AIRFOIL PYLON FOR AN AIRCRAFT

(75) Inventors: Clark M. Butler, San Antonio, TX (US); Ian J. Gilchrist, Bellevue, WA (US)

(73) Assignee: Calvin Burgess, Guthrie, OK (US)

( * ) Notice: Subject to any disclaimer, the term of this patent is extended or adjusted under 35 U.S.C. 154(b) by 0 days.

(21) Appl. No.: 13/346,614

(22) Filed: Jan. 9, 2012

(65) Prior Publication Data

US 2012/0119019 A1    May 17, 2012

Related U.S. Application Data

(62) Division of application No. 12/789,306, filed on May 27, 2010, now Pat. No. 8,091,824, which is a division of application No. 11/644,712, filed on Dec. 22, 2006, now Pat. No. 7,770,841.

(51) Int. Cl.
   *B64D 27/14*    (2006.01)
(52) U.S. Cl.
   USPC ............................................................ 244/54
(58) Field of Classification Search
   USPC .............................. 244/53 R, 54, 55; 248/554
   See application file for complete search history.

(56) References Cited

U.S. PATENT DOCUMENTS

| | | | | |
|---|---|---|---|---|
| 3,188,025 | A | * | 6/1965 | Moorehead ..................... 244/55 |
| 4,050,651 | A | * | 9/1977 | Neal et al. ........................ 244/15 |
| 4,311,289 | A | | 1/1982 | Finch |
| 4,629,147 | A | * | 12/1986 | Johnson et al. .................. 244/55 |
| 4,966,338 | A | * | 10/1990 | Gordon ............................ 244/54 |
| 5,149,016 | A | * | 9/1992 | Huhn et al. ...................... 244/55 |
| 5,496,001 | A | | 3/1996 | Skow |
| 5,529,263 | A | * | 6/1996 | Rudolph ......................... 244/55 |
| 5,779,191 | A | | 7/1998 | Brislawn |
| 5,855,340 | A | * | 1/1999 | Bacon ......................... 244/53 R |
| 6,364,254 | B1 | | 4/2002 | May |
| 6,565,045 | B1 | | 5/2003 | Correge et al. |
| 6,978,971 | B1 | | 12/2005 | Dun |
| 7,080,805 | B2 | | 7/2006 | Prichard et al. |

OTHER PUBLICATIONS

Mark, Robert P. "Spirit Wing modification enhances Learjet design." Jan. 2005, Aviation International News. <http://www.ainonline.com/ain-and-ainalerts/aviation-international-news/single-publication-story/browse/0/article/spirit-wing-modification-enhances-learjet-design>.

(Continued)

*Primary Examiner* — Tien Dinh
*Assistant Examiner* — Michael Kreiner
(74) *Attorney, Agent, or Firm* — Hall Estill Attorneys at Law; Daniel P. Dooley (57) ABSTRACT

An aircraft including a wing and a pylon, wherein the pylon provides an airfoil inverted for an airfoil of the wing, and an improvement and method for improved flight dynamics for 20 and 30 Series LEARJET® is provided. The improvement includes an increased distance between a leading edge of a wing and an intake of an engine of the aircraft, which reduces drag and increases lift for improved flight dynamics of the aircraft. The inverted airfoil of the pylon negates an influence of the pylon on flight dynamics for improved overall flight dynamics of the aircraft. The method includes steps of removing an original engine from an original pylon, removing the original pylon from the fuselage of the aircraft, and mounting a new pylon in a new location adjacent to the fuselage, wherein the new location is aft of the original location.

6 Claims, 5 Drawing Sheets

(56) References Cited

OTHER PUBLICATIONS

Padfield, R. Randall. "Spirit Wing Learjet 25 flies with FJ44 power." Feb. 2003, Aviation International News. <http://www.ainonline.com/ain-and-ainalerts/aviation-international-news/single-publication-story/browse/0/article/spirit-wing-learjet-25-flies-with-fj44-power>.

"News Release—Solid Business Base, Proven Technology Give SpiritLear Distinct Edge Over Light Jet Competition." Oct. 11, 2004, Spirit Wing Aviation, <http://staging.okcommerce.gov/test1/documents/Spirit_Wing_Aviation_NBAA_News_Release_151004794.pdf>.

Rosenlof, Kim. "Press Release—New Engines and More for Lear 25." Oct. 12, 2004, WestStar Aviation, <http://www.weststaraviation.com/Press_Room/Press_Releases/PR-SpiritLear.htm>.

"Business Aviation Engine Upgrades." David Higdon. Retrieved from http://www.avbuyer.com/articles/Article.asp on Sep. 1, 2009. No publish date.

Ko, Andy et al. Transonic Aerodynamics of a Wing/Pylon/Strut Juncture. AIAA-2003-4062. 21st AIAA Applied Aerodynamics Conference Jun. 23-26, 2003 / Orlando, FL.

* cited by examiner

INVERTED AIRFOIL PYLON FOR AN AIRCRAFT

RELATED APPLICATIONS

This application is a divisional of U.S. patent application Ser. No. 12/789,306 filed May 27, 2010, entitled "Inverted Airfoil Pylon For An Aircraft," which is a divisional of U.S. patent application Ser. No. 11/644,712 filed Dec. 22, 2006, entitled "Inverted Airfoil Pylon For An Aircraft," now U.S. Pat. No. 7,770,841, issued Aug. 10, 2010.

FIELD OF THE INVENTION

The claimed invention relates generally to the field of aviation and more particularly, but not by way of limitation, to a method and apparatus for improved flight dynamics for an aircraft.

BACKGROUND

The optimization of flight dynamics for an aircraft is an important task typically undertaken by aeronautical engineers during the development and testing phases involved in bringing an aircraft to market. Following development, testing, and certification phases of the Series 20 LEARJET®, the aircraft was introduced to the market in 1964, and was followed by the introduction of the Series 30 LEARJET® in 1974.

The handling characteristics of LEARJET® Series 20 and 30 yield aircraft that is fairly complex to fly, which in the number of applications necessitates the presence of two pilots during flight. The drag acting on aircraft, the available lift provided by the wings, and available thrust provided by the engines each contribute to the aircraft's operating efficiency and its ability to take off, land, and avoid a stall condition during flight.

Two conditions known to be present in LEARJET® Series 20 and 30 aircraft from their introduction to the present are, their susceptibility of encountering a stall condition, and the susceptibility of the aircraft to dip its nose when additional thrust is provided during flight.

Accordingly, there is a long felt need for improvements in the flight dynamics of LEARJET® Series 20 and 30 aircraft.

SUMMARY OF THE INVENTION

In accordance with a preferred embodiment, an aircraft includes at least a fuselage supporting a wing, an engine for propelling said aircraft, and a pylon disposed between said engine and said fuselage and securing said engine to said fuselage, wherein said pylon provides an airfoil inverted from an airfoil of said wing.

In accordance with a preferred embodiment, an improvement for an aircraft selected from a group consisting of 20 Series and 30 Series LEARJET® that preferably includes at least increasing the horizontal distance between the leading edge of a wing of the selected aircraft and an intake of an engine of the selected aircraft. The increased horizontal separation between the leading edge of the wing and the intake of the engine reduces drag and increases lift provided by the wing for improved flight dynamics of the selected aircraft. The improvement preferably further includes a pylon (for use in securing the engine to the fuselage) that provides an airfoil inverted in form from a form of an airfoil provided by the wing. The inverted airfoil neutralizes the effect of the pylon, relative to lift and drag, for improved flight dynamic of the aircraft.

For the 20 Series LEARJET®, the preferred embodiment also preferably includes, the engine secured to the pylon such that a centerline passing through the engine is substantially parallel to a waterline of the aircraft. The substantially parallel alignment between the engine centerline and said waterline reduces drag effecting said aircraft flight dynamics. An increased distance between the centerline of the engine and the waterline of the aircraft is preferably incorporated within the improvement to increase lift provided by the wings of the aircraft, and an increased distance between the centerline of said engine and a centerline of the fuselage is included in the improvement to reduce drag effecting the flight dynamics of the aircraft.

In accordance with an alternate preferred embodiment, a method of improving flight dynamics of an aircraft selected from a group consisting of (a 20 Series LEARJET® and a 30 Series LEARJET®) is provided by steps that preferably include: removing an original engine from an original pylon of the aircraft; removing the original pylon from an original location adjacent a fuselage of the aircraft; and mounting a new pylon in a new location adjacent the fuselage, wherein the new location is located aft of said original location.

The alternate preferred embodiment preferably further includes the step of mounting a new engine to the new pylon such that the distance between a centerline of the new engine (which runs substantially parallel to the waterline) and the waterline of the aircraft is greater than a distance between a central point along a centerline of the original engine and the waterline. The alternate preferred embodiment also preferably further includes the steps of: mounting the new engine on the new pylon such that a distance between a centerline of the new engine and a centerline of the fuselage is greater than a distance between a centerline of the original engine and the centerline of the fuselage; and covering the pylon with a skin, wherein the skin provides an airfoil inverted in shape relative to an airfoil shape provided by the wing of said aircraft.

These and various other features and advantages, which characterize preferred embodiments of the present invention, will be apparent from reading the following detailed description in conjunction with reviewing the associated drawings.

BRIEF DESCRIPTION OF THE DRAWINGS

FIG. 8 is a diagram of a flowchart of a method of making the present invention.

DETAILED DESCRIPTION

Reference will now be made in detail to one or more examples of the invention depicted in the accompanying figures. Each example is provided by way of explanation of the invention, and are not meant as, nor do they represent, limitations of the invention. For example, features illustrated or described as part of one embodiment may be used with another embodiment to yield still a different embodiment. Other modifications and variations to the described embodiments are also contemplated and lie within the scope and spirit of the invention.

Figure 1:
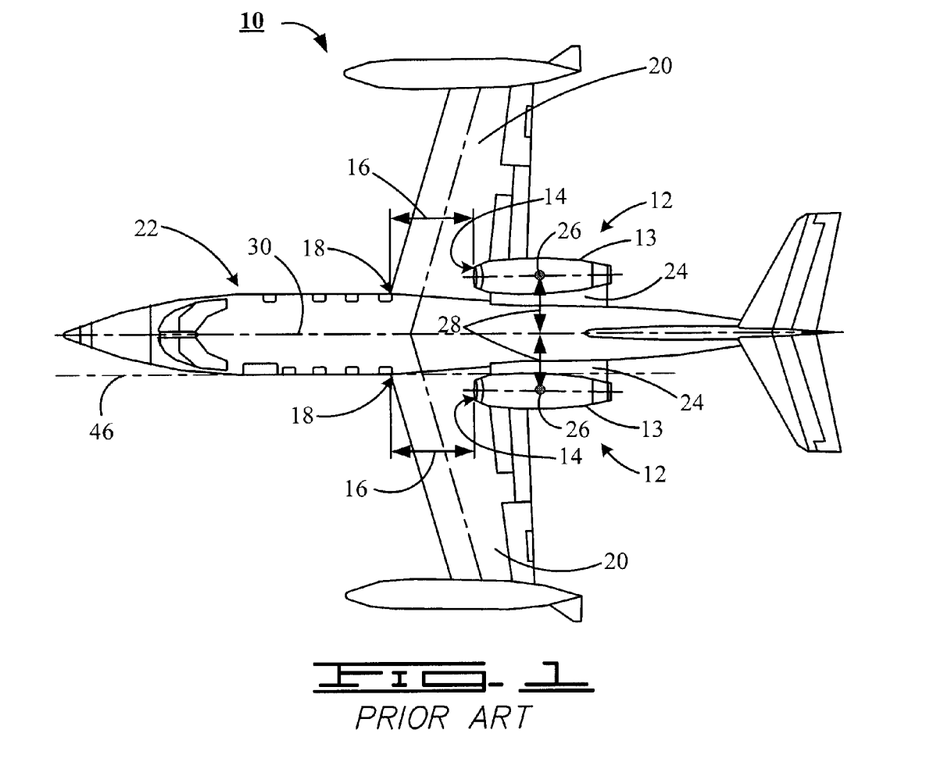
FIG. 1 is a top plan view of prior art aircraft applicable to the present invention.
Figure 2:
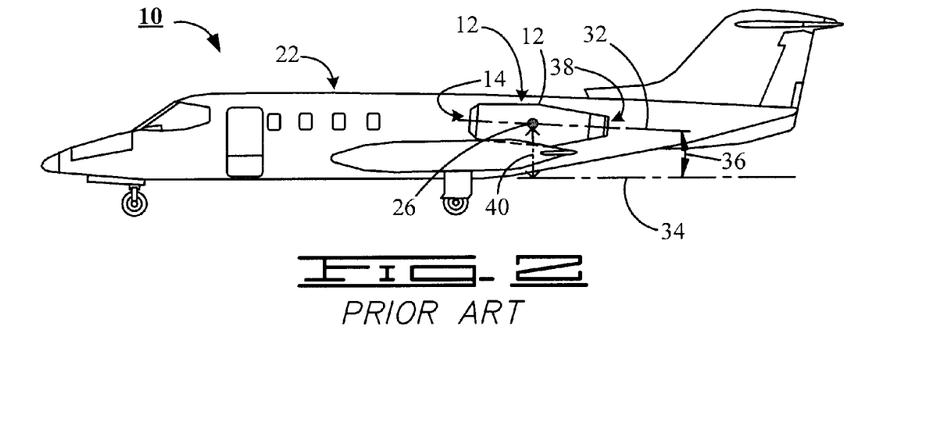
FIG. 2 provides a side elevational view of the prior art aircraft of FIG. 1.
Figure 3:
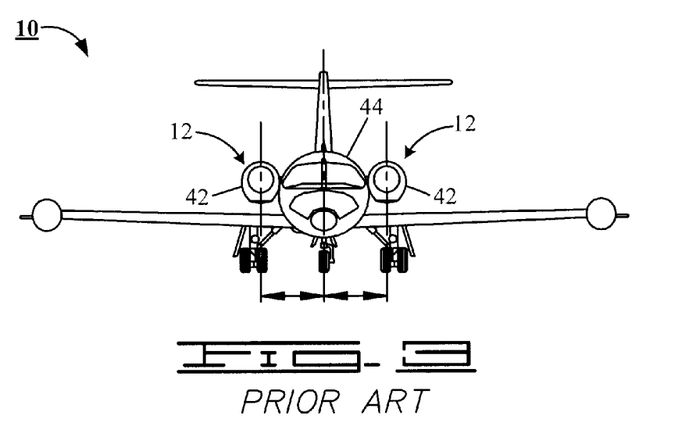
FIG. 3 provides a front elevational view of the prior art aircraft of FIG. 1.

Referring to the drawings, to provide an enhanced understanding of the present invention, a reader is encouraged to view prior art FIGS. 1, 2, and 3 in concert while proceeding with reading this description of the present invention. Collectively, prior art FIGS. 1, 2, and 3 depict prior art 20 and 30 Series LEARJET® aircraft applicable for use with the present invention.

Prior art FIG. 1 is useful for presenting a plan view of both a prior art 20 Series LEARJET® aircraft and a prior art 30 Series LEARJET® (collectively prior art aircraft 10) found useful in practicing the present invention. Prior art FIG. 2 shows the prior art aircraft 10, in side elevational view, for a prior art 20 Series LEARJET® aircraft, and prior art FIG. 3 shows the front elevational view suitable for depicting either the 20 or 30 Series prior art LEARJET® aircraft. When collectively viewing prior art FIGS. 1, 2, and 3, the reader's attention is drawn to the location of the engines 12, relative to other sections and references of the aircraft, and in particular to the nacelle 13 enclosing each engine 12.

Prior art FIG. 1 shows that engine inlets 14, of the engines 12, are correspondingly positioned at a predetermined distance 16 (of about 153 centimeters) from a corresponding leading edge 18, of their corresponding wings 20, and that each engine 12 is secured to a fuselage 22, of the prior art aircraft 10 by a pylon 24. Prior art FIG. 1 further shows centers of mass 26, of the engines 12, are correspondingly positioned at a predetermined distance 28 (of about 111 centimeters) from a centerline 30, of the fuselage 22, of the prior art aircraft 10.

The prior art aircraft 10, of FIG. 2, depicts an orientation of the engine 12, for a prior art 20 Series LEARJET® aircraft relative to the fuselage 22 via the relationship between a centerline 32 of the engine 12, and a waterline 34 of the prior art aircraft 10. In the prior art 20 Series LEARJET®; the engine 12 is set at a predetermined pitch angle 36 (of about 3°). That is, the engine 12 slopes from the engine inlet 14 to an engine outlet 38 at about a three-degree angle. Prior art FIG. 2 also shows the center of mass 26, of the engine 12, is positioned at a predetermined distance (of about 101 centimeters) from the waterline 34.

For both the 20 and 30 Series prior art LEARJET® shown by FIG. 3, nacelles 42 and fuselage skin 44 appear to abut one another. However, by referring back to FIG. 1, it can be seen that the engines 12 are offset from the fuselage 22 by the pylons 24. Nonetheless, FIG. 1 shows that a portion of the fuselage skin 44 and a portion of the nacelle 42 of the engine 40 lie coextensively with a cord line 46 (of FIG. 1).

The position of the engines 12 of the prior art aircraft 10 relative to the wings 20 and the fuselage 22 has a direct bearing on the flight dynamics of prior art aircraft 10. The location of the engines 12, relative to the wings 20 creates a partial air dam between wings 20 and the engines 12. The effect of this partial air dam is a disruption in the fluid flow over the wings 20, which decrease the effectiveness of the wings 20. In other words, by partially disrupting the flow of fluid over the wing, the amount of available lift provided by the wing is diminished. The diminished availability of lift provided by wings 20 reduces the ability of prior art aircraft 10 to avoid stall conditions during flight.

The spacing of the engines 12, relative to the fuselage 22 also creates a partial air dam for fluid flowing between the fuselage 22 and the engines 12. The result of this disruption in fluid flow is an increase in the overall drag experienced by the prior art aircraft 10.

For the 20 Series prior art LEARJET®, the problem of reduced lift capability of the wings 20 and increased drag created between the fuselage 22 in the engines 12 is exasperated by having the engines 12 mounted at a 3° pitch, relative to the waterline 34. Mounting the engines 12 at a 3° pitch relative to the waterline 34 introduces additional drag and difficult handling characteristics into the flight dynamics of the prior art aircraft 10. In addition to the increase in drag, the 3° pitch further affects the flight dynamics of the 20 Series LEARJET® by causing the nose of the prior art aircraft 10 to dip when additional throttle is applied to the engines 12 of the 20 Series LEARJET® during flight.

Figure 4:
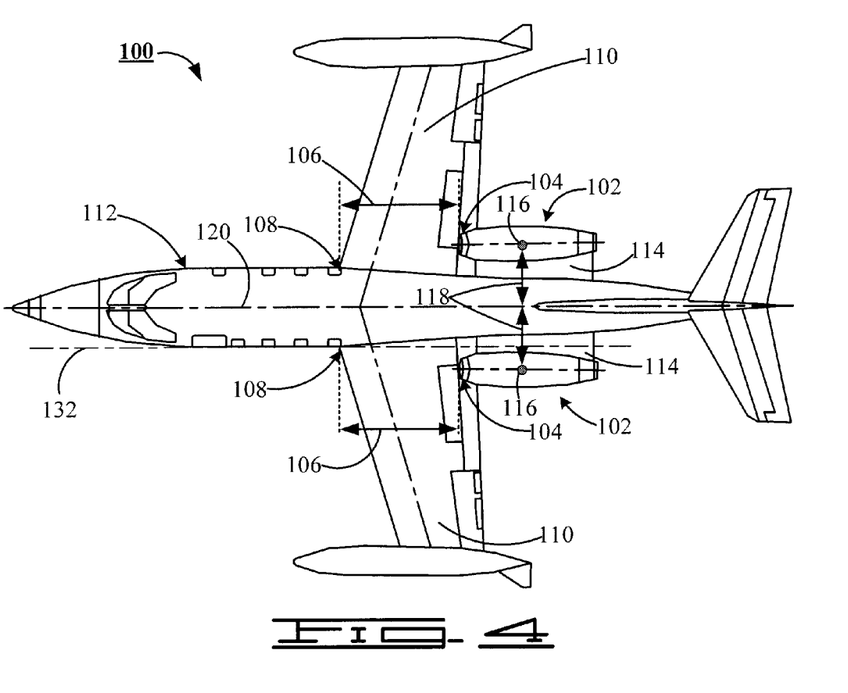
FIG. 4 is a top plan view of an aircraft of the present invention.
Figure 5:
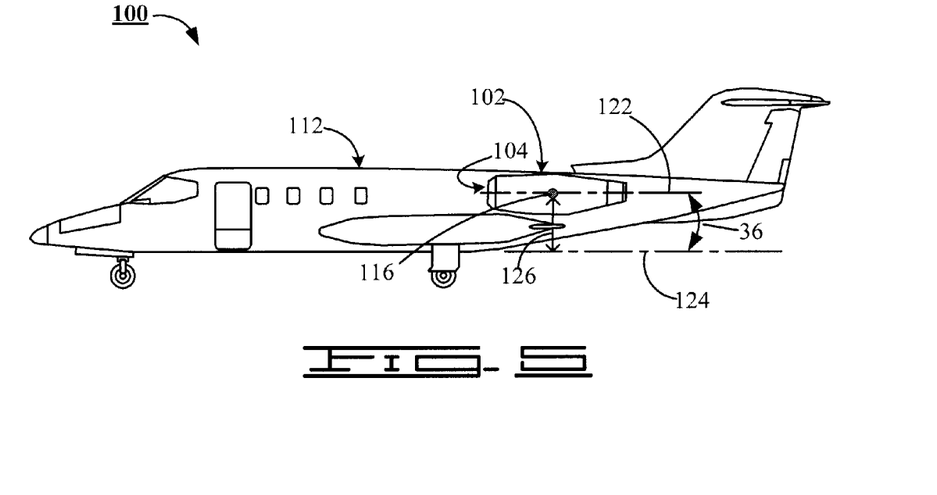
FIG. 5 provides a side elevational view of the aircraft of FIG. 4.
Figure 6:
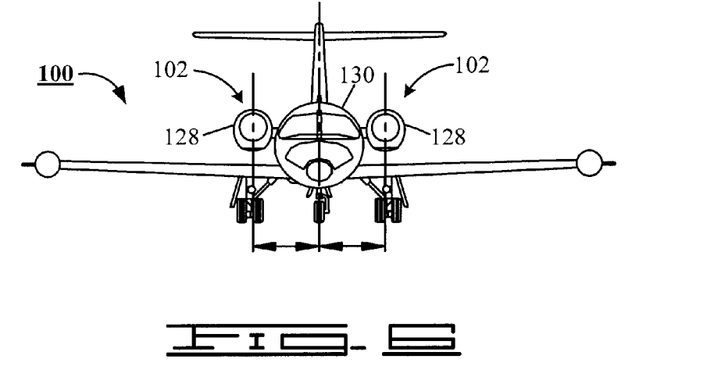
FIG. 6 provides a front elevational view of the aircraft of FIG. 4.

For ease in contrasting the present invention with the prior art, FIGS. 4, 5, and 6 are provided to depict the present invention in views comparable to FIGS. 1, 2, and 3. Accordingly, viewing FIGS. 4, 5, and 6 together will provide an enhanced understanding of the present invention. Collectively, FIGS. 4, 5, and 6 depict structural changes made to the 20 and 30 Series LEARJET® aircraft to produce an improved present inventive aircraft 100. FIG. 4 presents a plan view of an inventive aircraft 100 and is useful for showing a change in engine location between the prior art aircraft 10 (of FIG. 1) and the inventive aircraft 100. FIG. 5 shows the inventive aircraft 100 in side elevational view, which is useful in helping with an understanding of a structural change made to the 20 Series LEARJET® in arriving at the present inventive aircraft 100. FIG. 6 shows the front elevational view of the inventive aircraft 100 suitable for depicting an additional structural change employed in arriving at the present inventive aircraft 100. When collectively viewing FIGS. 4, 5, and 6, the reader's attention is drawn to the location of the engines 102, relative to other sections and references of the inventive aircraft 100.

In a preferred embodiment shown by FIG. 4, engine inlets 104 of the engines 102, are preferably positioned at a distance 106 (of about 194 centimeters) from corresponding leading edges 108 of corresponding wings 110. Each engine 102 is preferably secured to a fuselage 112 by a pylon 114. FIG. 4 further shows centers of mass 116, of the engines 102, are preferably correspondingly positioned at a distance 118 (of about 121.5 centimeters) from a centerline 120, of the fuselage 112 of the inventive aircraft 100.

The inventive aircraft 100 of FIG. 5 shows an orientation of the engine 102 (for an inventive aircraft 100 based on a 20 Series LEARJET®) relative to a centerline 122 of the engine 102, and a waterline 124 of the inventive aircraft 100. In the 20 Series LEARJET® prior art aircraft 10 (of FIG. 2), the engine 12 is set at a downwardly sloping 3° pitch. In a preferred embodiment shown by FIG. 5, the relationship between the centerline 122 and the waterline 124 shows an absence of a pitch, i.e., the centerline 122 lies substantially parallel to the waterline 124. FIG. 5 also shows the center of mass 116, of the engine 102, is positioned at a selected distance 126 (of about 109 centimeters) from the waterline 124.

In a preferred embodiment of the inventive aircraft 100 shown by FIG. 6, nacelles 128 are offset from a fuselage skin 130 such that a portion of the pylons 114 are brought into view when viewing the inventive aircraft 100 from a front elevational perspective. By referring back to FIG. 4, it can be seen that the engines 102 are offset from the fuselage 112 by the pylons 114 at a distance sufficient to assure that the nacelle 128 does not lie coextensively with a cord line 132, which lies tangent to the fuselage skin 130.

The position of the engines 102 of the inventive aircraft 100 relative to the wings 110 and the fuselage 112 has a direct bearing on improved flight dynamics of the inventive aircraft 100, when compared to the flight dynamics of the prior art aircraft 10 (of FIGS. 1-3). The location of the engines 102, relative to the wings 110 alleviates the partial air dam present between wings 20 in the engines 12 of the prior art aircraft 10. By alleviating the air dam, the amount of available lift provided by the wings 110 is greatly enhanced. The spacing of the engines 102, relative to the fuselage 112 removes from the inventive aircraft 100 the partial air dam developed between the fuselage 22 in the engines 12 of prior art aircraft 10, which decreases the overall drag experienced by the inventive aircraft 100.

For the inventive aircraft 100 based on the 20 Series LEARJET®, removing the 3° pitch of the engines 12, relative to the waterline 34 on the prior art aircraft 10 (of FIG. 2), alleviates the drag created by the 3° pitch, and the tendency of the nose to dip during in flight accelerations.

In a preferred embodiment, the following dimensional changes for engine location have been found useful in providing the inventive aircraft 100 based on either the 20 or 30 Series LEARJET®. Those dimensional changes for engine location include positioning the engines 102: about 41 centimeters further back from the leading edge 108 of the wing 110 at a point adjacent the fuselage 112; about 8 centimeters further up from the waterline 124; and about 10.2 centimeters further out from the fuselage centerline 120. It has been found that these improvements dramatically improve the flight dynamics of the inventive aircraft 100, relative to the flight dynamics of the prior art aircraft 10. The improvement includes a greatly enhanced ability to avoid stall conditions during in flight maneuvers.

Figure 7:
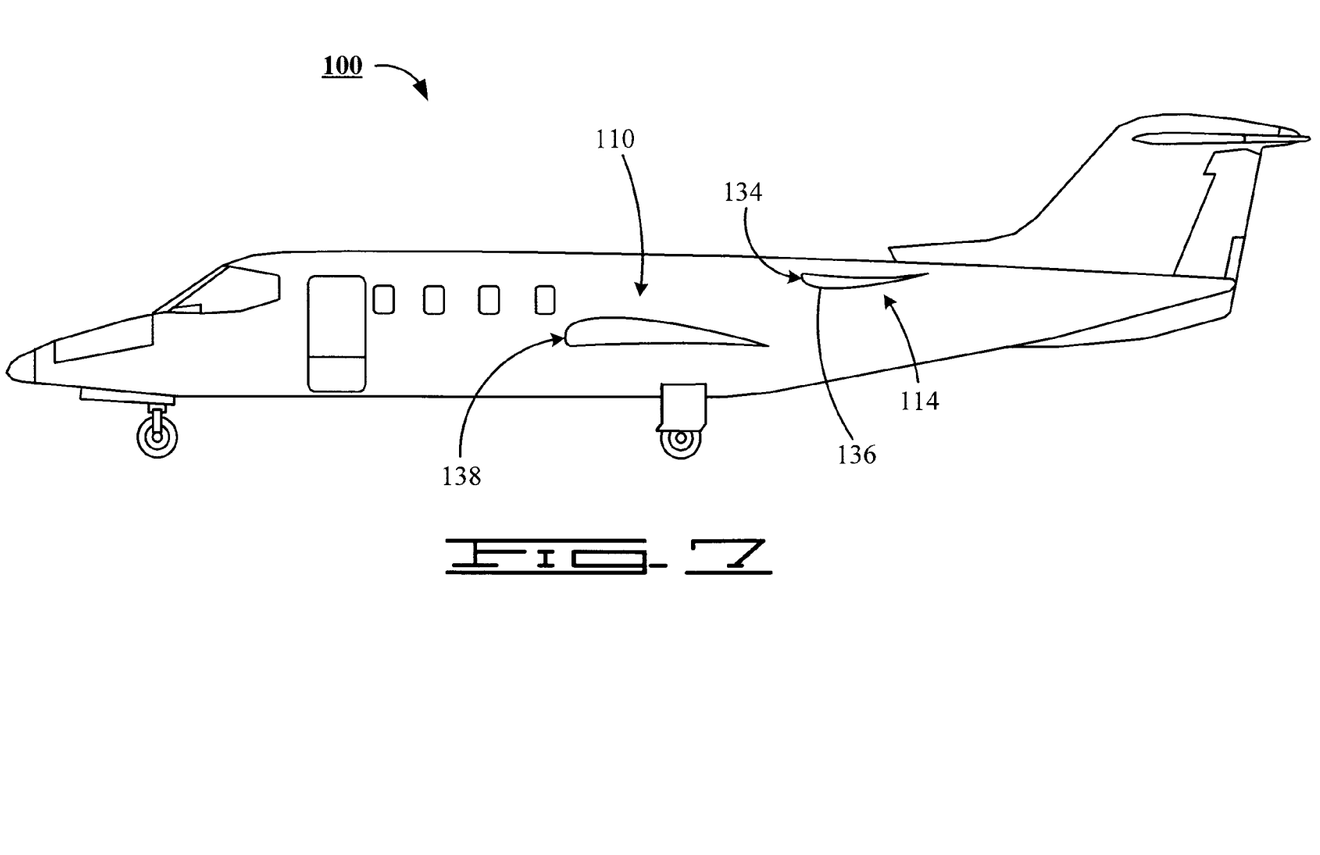
FIG. 7 shows a partial cross-sectional, side elevational view of a pylon and a wing of the aircraft of FIG. 4.

FIG. 7 shows that in a preferred embodiment of the present invention, an airfoil 134 is provided by a skin 136 of the pylon 114. Preferably, the shape of the airfoil 134 is inverted in form from the shape of an airfoil 138 provided by the wing 110. By presenting the airfoil 134 to an air stream in an orientation inverted from the airfoil 138 of the wing 110, an influence of the pylon 114 on the flight dynamics of the inventive aircraft 100 is neutralized. That is to say, by providing an inverted airfoil 134 covering the pylon 114, the pylon 114 neither adds to the drag nor detracts from the lift of the inventive aircraft 100. The shape of the airfoil of the pylon, i.e., inverted from the shape of the airfoil of the wing, has removed the pylon as a structural component effecting the aerodynamics of the aircraft.

Turning to FIG. 8, the flow chart 200 depicts a process of forming an inventive aircraft (such as 100). The method commences at start step 202 and proceeds to process step 204 with the removal of an engine (such as 12). At process step 206, a pylon (such as 24) is removed from a fuselage (such as 22) of the inventive aircraft. Following the removal of the pylon from the fuselage; providing a portion of fuselage skin (such as 44) to cover the portion of the fuselage left open by removal of the pylon; and removing a portion of fuselage skin from the airframe in preparation for mounting a new pylon (such as 114), the new pylon is secured to the fuselage at process step 208.

At process step 210, a new engine (such as 102) is mounted to the new pylon. At process step 212, the new pylon is covered with a skin (such as 136) to provide an airfoil (such as 134) and the process concludes at end process step 214.

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of parts within the principles of the invention to the full extent indicated by the broad general meaning of the terms in which the appended claims are expressed. For example, the particular elements may vary depending on the particular application for a select engine, while maintaining the same functionality without departing from the spirit and scope of the invention.

What is claimed is:

1. An improved aircraft comprising:
an increased horizontal distance between a leading edge of a wing of said improved aircraft and an intake of an engine of said improved aircraft, wherein the increased horizontal distance between the leading edge of the wing of said improved aircraft and the intake of the engine of said improved aircraft is relative to a horizontal distance between the leading edge of the wing of said improved aircraft and the intake of the engine of said improved aircraft when said improved aircraft is in its non-improved state, and wherein said increased distance reduces drag and increases lift of said wing for improved flight dynamics of said improved aircraft; and
a pylon disposed between said engine and a fuselage of said improved aircraft, wherein said pylon provides a fitted, flap free airfoil inverted in shape about its longitudinal axis relative to an airfoil shape provided by said wing about its longitudinal axis, said pylon provides improved flight dynamics of said improved aircraft, and further wherein a center of mass of the engine of said improved aircraft is positioned an increased horizontal distance from a centerline of the fuselage of said improved aircraft relative to a horizontal distance between a center of mass of an engine and a centerline of a fuselage of the non-improved aircraft, in which the centerline of the fuselage of the non-improved aircraft and the improved aircraft are a common centerline.

2. The improved aircraft of claim 1, further comprising, said engine secured to said pylon such that a centerline passing through said engine is substantially parallel to a waterline of said improved aircraft, said substantially parallel alignment between said engine centerline and said waterline reduces drag affecting said improved aircraft flight dynamics.

3. The improved aircraft of claim 1, further comprising, an increased vertical distance between a centerline of said engine and a waterline of said improved aircraft, wherein the increased vertical distance between the centerline of said engine and the waterline of said improved aircraft is relative to a vertical distance between the centerline of said engine and the waterline of said improved aircraft when said improved aircraft is in its non-improved state, and wherein said increased vertical distance between said engine centerline and said waterline increases lift provided by said wing of said improved aircraft.

4. The improved aircraft of claim 1, further comprising, an increased vertical distance between a centerline of said engine and a centerline of said fuselage, wherein the increased vertical distance between the centerline of said engine and the centerline of said fuselage of said improved aircraft is relative to a vertical distance between the centerline of said engine and the centerline of said fuselage of said improved aircraft when said improved aircraft is in its non-improved state, and wherein said increased vertical distance between said engine centerline and said fuselage centerline reduces drag affecting said aircraft flight dynamics.

5. The improved aircraft of claim 2, further comprising, an increased vertical distance between said engine centerline and a waterline of said improved aircraft, wherein the increased vertical distance between the centerline of said engine and the waterline of said improved aircraft is relative to a vertical distance between the centerline of said engine and the waterline of said improved aircraft when said improved aircraft is in its non-improved state, and wherein said increased vertical distance between said engine centerline and said waterline increases lift provided by said wing of said improved aircraft.

6. The improved aircraft of claim 5, further comprising, an increased vertical distance between said engine centerline and a centerline of said fuselage, wherein the increased vertical distance between the centerline of said engine and the centerline of said fuselage of said improved aircraft is relative to a vertical distance between the centerline of said engine and the centerline of said fuselage of said improved aircraft when said improved aircraft is in its non-improved state, and wherein said increased vertical distance between said engine centerline and said fuselage centerline reduces drag affecting said aircraft flight dynamics.

\* \* \* \* \*